United States Patent
Hwang et al.

(10) Patent No.: US 11,146,979 B2
(45) Date of Patent: Oct. 12, 2021

(54) METHOD FOR TERMINAL TO RECEIVE DOWNLINK SIGNAL IN WIRELESS COMMUNICATION SYSTEM AND TERMINAL FOR SAME

(71) Applicant: LG Electronics Inc., Seoul (KR)

(72) Inventors: Daesung Hwang, Seoul (KR); Inkwon Seo, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/226,771

(22) Filed: Apr. 9, 2021

(65) Prior Publication Data

US 2021/0227418 A1 Jul. 22, 2021

Related U.S. Application Data

(63) Continuation of application No. PCT/KR2019/014269, filed on Oct. 28, 2019.

(60) Provisional application No. 62/758,502, filed on Nov. 9, 2018.

(30) Foreign Application Priority Data

Oct. 26, 2018 (KR) .......... 10-2018-0129359
Dec. 17, 2018 (KR) .......... 10-2018-0163300

(51) Int. Cl.
*H04W 24/10* (2009.01)
*H04W 72/12* (2009.01)
*H04W 72/04* (2009.01)

(52) U.S. Cl.
CPC ....... *H04W 24/10* (2013.01); *H04W 72/0446* (2013.01); *H04W 72/12* (2013.01)

(58) Field of Classification Search
CPC .. H04W 24/10; H04W 72/0446; H04W 72/12
USPC .......................................... 370/329
See application file for complete search history.

(56) References Cited

U.S. PATENT DOCUMENTS

| | | | |
|---|---|---|---|
| 2019/0199420 A1* | 6/2019 | Faxer | H04B 7/0632 |
| 2020/0037260 A1* | 1/2020 | Fu | H04L 27/2646 |
| 2020/0305145 A1* | 9/2020 | Li | H04W 72/0413 |
| 2020/0351682 A1* | 11/2020 | Cirik | H04L 5/0091 |
| 2020/0351841 A1* | 11/2020 | Cirik | H04L 5/0048 |
| 2021/0022152 A1* | 1/2021 | Yang | H04W 72/10 |
| 2021/0028961 A1* | 1/2021 | Lee | H04W 28/0268 |
| 2021/0135822 A1* | 5/2021 | Baldemair | H04W 72/042 |

* cited by examiner

*Primary Examiner* — Peter G Solinsky
(74) *Attorney, Agent, or Firm* — Fish & Richardson P.C.

(57) ABSTRACT

Disclosed is a method for a terminal to receive a downlink signal from a base station in a wireless communication system. Specifically, the present invention may include: a step for acquiring a minimum CSI-RS triggering offset that is applicable to a CSI-RS for aperiodic CSI on the basis of the reception of a minimum applicable slot interval for the scheduling of a Physical Downlink Control Channel (PDCCH) and a Physical Downlink Shared Channel (PDSCH); a step for receiving, from the base station, downlink control information (DCI) for triggering the aperiodic CSI in a first slot; and a step for receiving the CSI-RS from the base station at a point in time later than the first slot and a second slot that is set on the basis of a CSI-RS triggering offset larger than or equal to the minimum applicable CSI-RS triggering offset.

9 Claims, 16 Drawing Sheets

FIG. 4A                    FIG. 4B

METHOD FOR TERMINAL TO RECEIVE DOWNLINK SIGNAL IN WIRELESS COMMUNICATION SYSTEM AND TERMINAL FOR SAME

CROSS-REFERENCE TO RELATED APPLICATIONS

This application is a continuation of International Application No. PCT/KR2019/014269, filed on Oct. 28, 2019, which claims priority under 35 U.S.C. 119(a) to Korea Patent Application Nos. 10-2018-0129359, filed on Oct. 26, 2018, 10-2018-0163300, filed on Dec. 17, 2018 and U.S. Provisional Application No. 62/758,502, filed on Nov. 9, 2018. The disclosures of the prior applications are incorporated by reference in their entirety.

TECHNICAL FIELD

The present disclosure relates to a method by which a terminal receives a downlink signal from a base station in a wireless communication system and terminal therefor and, more particularly, to a method by which a terminal receives information about a time period in which no buffering is performed for a downlink signal and receives the downlink signal after the time period based on the received information about the time period.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method by which a terminal receives a downlink signal in a wireless communication system. Specifically, the object of the present disclosure is to provide a method by which a terminal receives information about a time period in which no buffering is performed for a downlink signal and receives the downlink signal after the time period based on the received information about the time period.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of receiving a downlink signal by a user equipment (UE) in a wireless communication system is provided. The method may include: obtaining a minimum channel state information reference signal (CSI-RS) triggering offset applicable to a CSI-RS for aperiodic channel state information (CSI) based on reception of a minimum slot interval applicable to scheduling of a physical downlink control channel (PDCCH) and a physical downlink shared channel (PDSCH); receiving downlink control information (DCI) triggering the aperiodic CSI in a first slot from the a base station; and receiving the CSI-RS from the base station at a time after a second slot configured based on the first slot and a CSI-RS triggering offset greater than or equal to the applicable minimum CSI-RS triggering offset.

The reception of the applicable minimum slot interval and the acquisition of the applicable minimum CSI-RS triggering offset may be based on L1 signaling.

The applicable minimum slot interval may be equal to the applicable minimum CSI-RS triggering offset.

The UE may skip receiving the CSI-RS for a time period between the first and second slots.

The UE may skip buffering for the CSI-RS for the time period.

The method may further include reporting the aperiodic CSI to the base station.

When the base station transmits the CSI-RS in the time period, a measurement result for measurement resources included in the time period may be excluded from the reported aperiodic CSI.

The time after the second slot may be a time after decoding of the PDCCH including the DCI is completed.

The UE may be capable of communicating at least one of another UE other than the UE, the base station, a network, or an autonomous driving vehicle.

According to an example or an implementation of the present disclosure, a period for which no buffering is performed for a downlink signal to be received may be preconfigured, thereby stably processing a physical downlink control channel (PDCCH) and reducing power required to receive the downlink signal.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate implementations of the present disclosure and together with the description serve to explain the principle of the disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require higher communication traffic as time flows, there is a need for a next-generation fifth-generation (5G) system, which is a wireless broadband communication system enhanced over the legacy LTE system. In this next-generation 5G system, which is referred to as new RAT, communication scenarios are classified into enhanced mobile broadband (eMBB), ultra-reliability and low-latency communication (URLLC), massive machine-type communications (mMTC), and so on.

Here, eMBB is a next-generation mobile communication scenario with features such as high spectrum efficiency, high user experienced data rates, and high peak data rates. URLLC is a next-generation mobile communication scenario with features such as ultra-reliable and ultra-low latency and ultra-high availability (e.g., V2X, emergency services, remote control, etc.). In addition, mMTC is a next-generation mobile communication scenario with features such as of low cost, low energy, short packets, and massive connectivity. (e.g., IoT).

Figure 1:
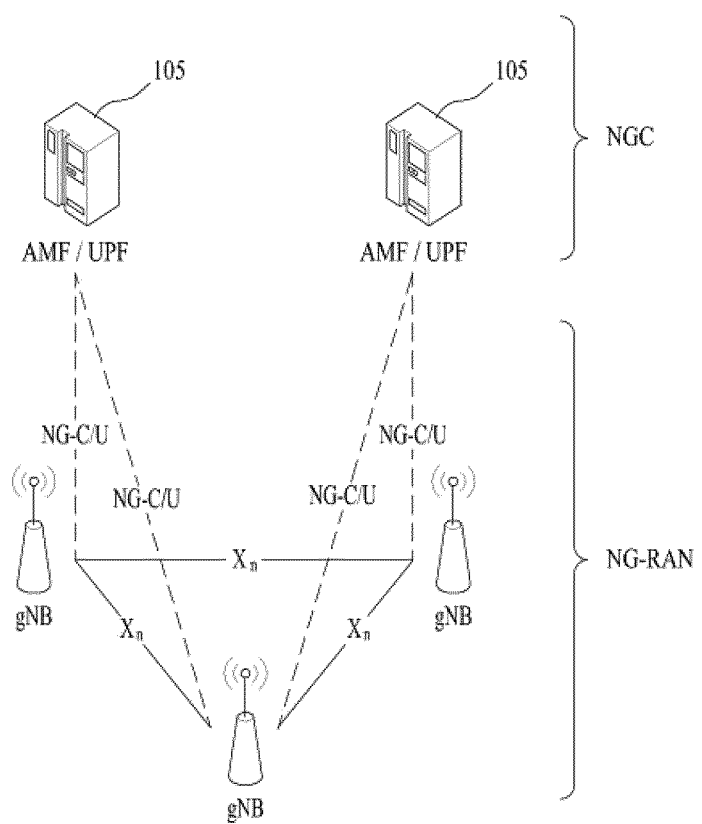
FIG. 1 is a view illustrating an example of a network architecture of a new radio (NR) system.

FIG. 1 is a view illustrating an example of a network architecture of an NR system.

Referring to FIG. 1, the NG-RAN includes gNBs that provide a UE with user plane protocol (e.g., SDAP, PDCP, RLC, MAC, and PHY) and control plane protocol (e.g., RRC, PDCP, RLC, MAC, and PHY) terminations. The gNBs are interconnected through an Xn interface. The gNBs are connected to the NGC through an NG interface. For example, the gNBs are connected to a core network node having an access and mobility management function (AMF) through an N2 interface, which is one of interfaces between the gNBs and the NGC and to a core network node having a user plane function (UPF) through an N3 interface, which is another interface between the gNB and the NGC. The AMF and the UPF may be implemented by different core network devices or may be implemented by one core network device. In the RAN, signal transmission/reception between a BS and a UE is performed through a radio interface. For example, signal transmission/reception between the BS and the UE in the RAN is performed through a physical resource (e.g., a radio frequency (RF)). In contrast, signal transmission/reception between the gNB and the network functions (e.g., AMF and UPF) in the core network may be performed through physical connection (e.g., optical cable) between the core network nodes or through logical connection between the core network functions, rather than through the radio interface.

Now, 5G communication including an NR system will be described.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional tasks and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both tasks and entertainment. The cloud storage is a special use case which accelerates growth of uplink data transmission rate. 5G is also used for a remote task of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential for smart grid control, industrial automation, robotics, and drone control and adjustment.

Next, a plurality of use cases in the 5G communication system including the NR system will be described in more detail.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Figure 2:
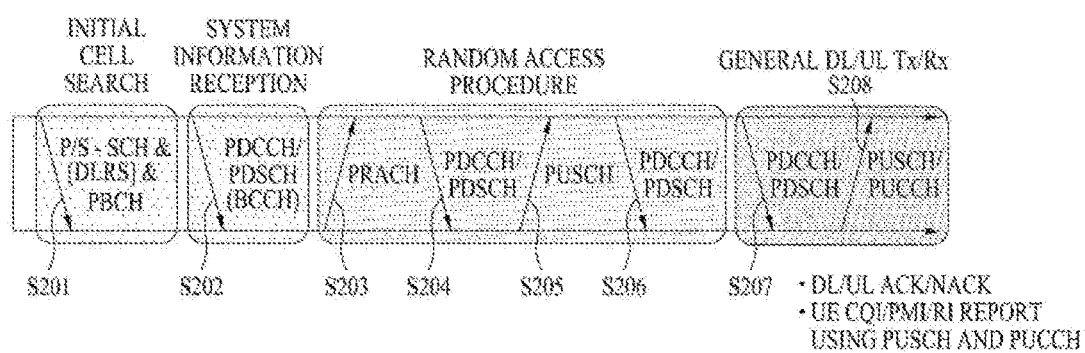
FIG. 2 is a view illustrating physical channels and a general signal transmission method using the physical channels in a 3rd Generation Partnership Project (3GPP) system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

NR supports various numerologies (or subcarrier spacings (SCSs)) to provide various 5G services. For example, the NR system may support a wide area in conventional cellular bands in an SCS of 15 kHz and support a dense urban and low latency environment and a wider carrier bandwidth in an SCS of 30/60 kHz. In an SCS of 60 kHz or above, the NR system supports a bandwidth higher than 24.25 GHz to overcome phase noise.

NR frequency bands may be classified into two frequency ranges. These two frequency ranges may be defined as FR1 and FR2. Here, FR1 may mean 'sub-6 GHz range', and FR2 may mean 'above 6 GHz range', that is, a millimeter wave (mmW).

Table 1 below shows NR frequency bands.

TABLE 1

| Frequency Range Designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Bandwidth Part (BWP)

The NR system may support up to 400 MHz per carrier. If a UE operating in such a wideband carrier always keeps a radio frequency (RF) module on for the whole carrier, the battery consumption of the UE may increase. Further, considering multiple use cases (e.g., eMBB, URLLC, mMTC, V2X, etc.) operating in one wideband carrier, different numerologies (e.g., SCSs) may be supported for different frequency bands of the carrier. Further, each UE may have a different capability regarding a maximum bandwidth. In this regard, the eNB may indicate the UE to operate only in a partial bandwidth, not the total bandwidth of the wideband carrier. The partial bandwidth is referred to as a bandwidth part (BWP). A BWP in the frequency domain is a subset of contiguous common RBs defined for numerology $\mu_i$ in BWP i of the carrier, and one numerology (e.g., SCS, CP length, and/or slot/mini-slot duration) may be configured for the BWP.

The eNB may configure one or more BWPs in one carrier configured for the UE. If UEs are concentrated in a specific BWP, some of the UEs may be switched to another BWP, for load balancing. For frequency-domain inter-cell interference cancellation between adjacent cells, BWPs at both ends of the total bandwidth of a cell except for some center spectrum may be configured in the same slot. That is, the eNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

In the NR system, a DL channel and/or a DL signal may be transmitted/received within an active DL BWP. In addition, a UL channel and/or a UL signal may be transmitted/received within an active UL BWP.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16QAM), 64-ary QAM (64QAM), or 256-ary QAM (256 QAM). A TB is encoded to a codeword. The PDSCH may deliver up to two codewords. The codewords are individually scrambled and modulated, and modulation symbols of each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 3:
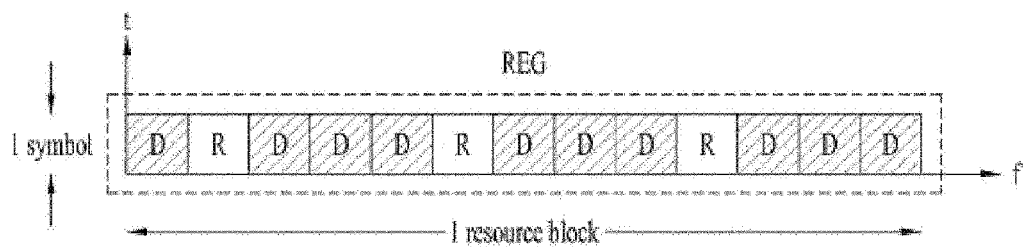
FIGS. 3 to 5 are diagrams for explaining a physical downlink control channel (PDCCH) of the NR system.
Figure 6:
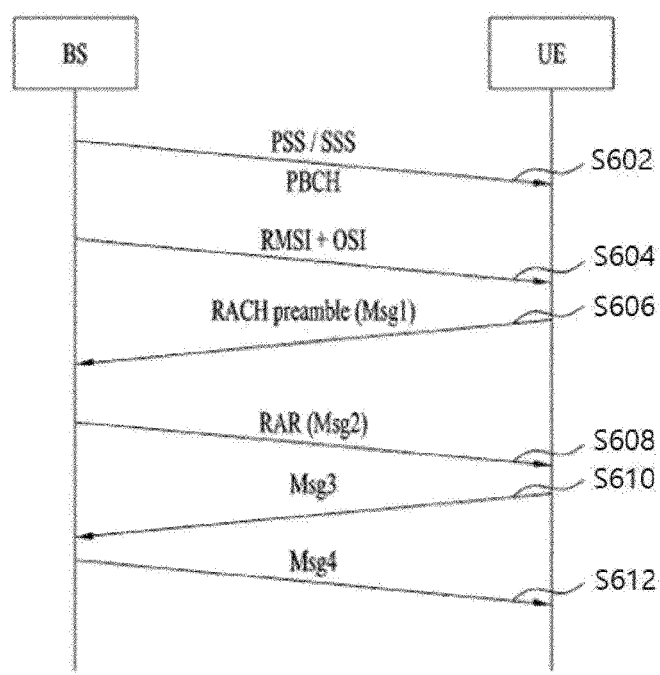
FIG. 6 illustrates a beam-based initial access procedure.

FIG. 3 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

Figure 4:
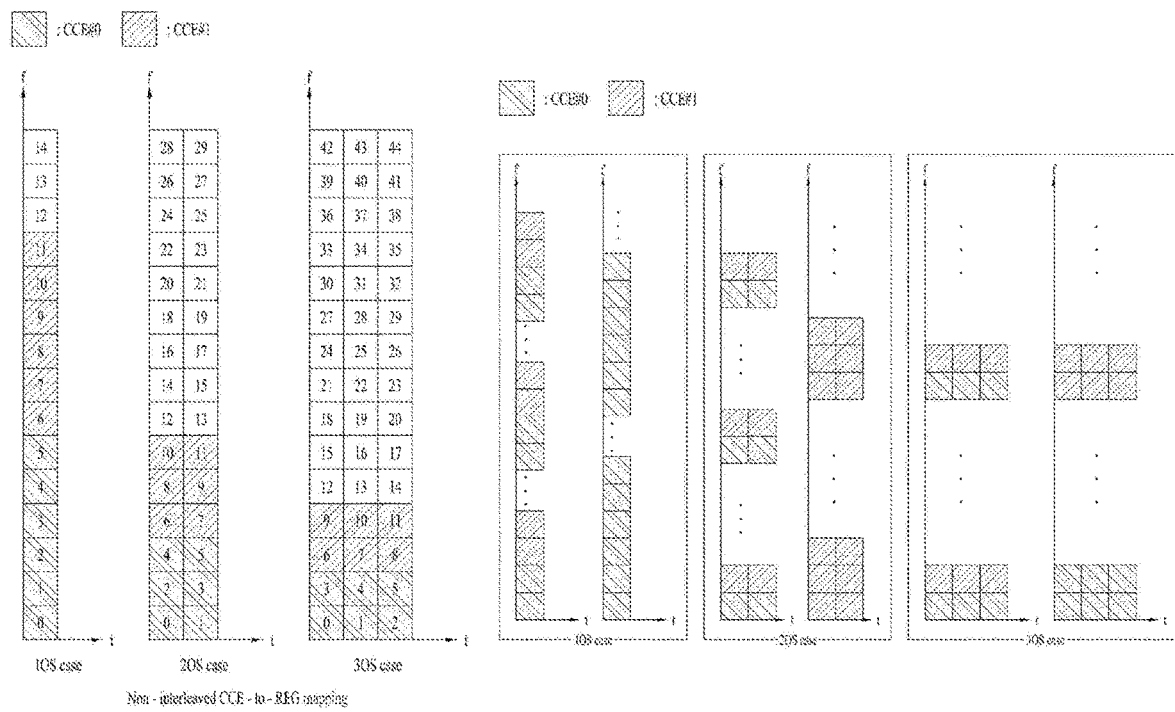

CCE-to-REG mapping for the CORESET may be an interleaved type or a non-interleaved type. FIG. 4A is an exemplary view illustrating non-interleaved CCE-REG mapping, and FIG. 4B is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 5:
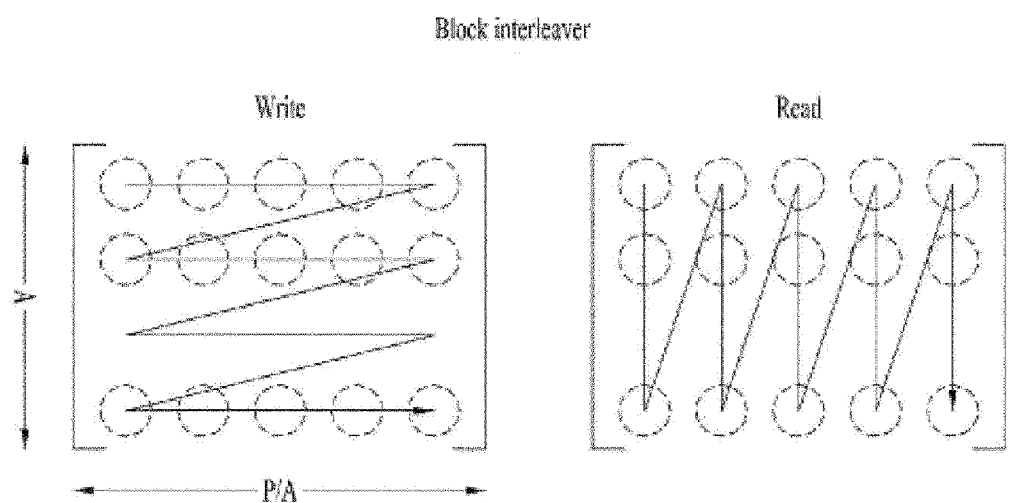
Figure 8:
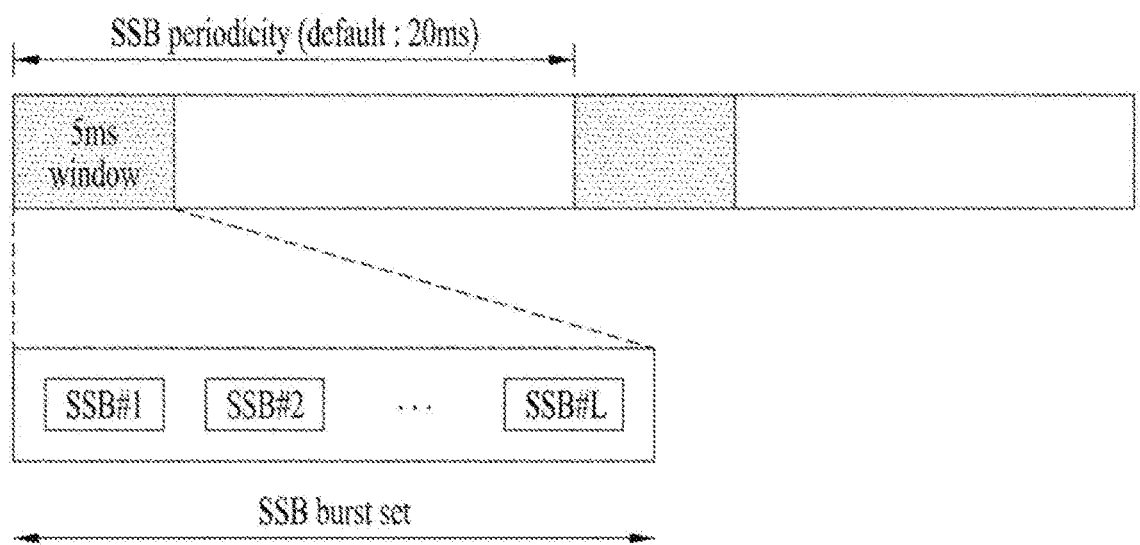

FIG. 5 illustrates an exemplary block interleaver. For the above interleaving operation, the number of rows in a (block) interleaver is set to one or 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. 8. Cyclic shift (CS) of an interleaving unit is applied based on an ID which is configurable independently of a configurable ID for the DMRS.

A UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in unit of slot) and a PDCCH monitoring offset (in unit of slot).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 2 lists exemplary features of the respective search space types.

TABLE 2

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 2-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 3 lists exemplary DCI formats transmitted on the PDCCH.

TABLE 3

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s)where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

Initial Random Access (RA)

FIG. 6 illustrates a beam-based initial access procedure. In 3GPP NR, a physical channel or a reference signal may be transmitted based on beamforming. In this case, beams should be aligned/managed between a base station (BS) and a user equipment (UE) to transmit and receive signals. In the radio resource control (RRC) IDLE mode, beam alignment may be performed based on a synchronization signal block (SSB). In the RRC CONNECTED mode, beam alignment may be performed based on a channel state information reference signal (CSI-RS) (in DL) and a sounding reference signal (SRS) (in UL).

Referring to FIG. 6, the BS may periodically transmit an SSB (S602). Here, the SSB includes a primary synchronization signal/secondary synchronization signal/physical broadcast channel (PSS/SSS/PBCH). The SSB may be transmitted based on beam sweeping (see FIG. 6). Thereafter, the BS may transmit remaining minimum system information (RMSI) and other system information (OSI) (S604). The RMSI may include information (e.g., PRACH configuration information) necessary for the UE to initially access the BS. After performing SSB detection, the UE identifies the best SSB. Then, the UE may transmit an RACH preamble (Message 1 (Msg1)) to the BS on a PRACH resource linked/corresponding to the index (i.e., beam) of the best SSB (S606). The beam direction of the RACH preamble is associated with the PRACH resource. The association between the PRACH resource (and/or the RACH preamble) and the SSB (index) may be established by system information (e.g., RMSI). Then, as a part of the RACH procedure, the BS transmits a random access response (RAR) (Msg2) in response to the RACH preamble (S608). Specifically, scheduling information about an RAR message may be CRC-masked with a random access radio network temporary identifier (RA-RNTI) and transmitted on an L1/L2 control channel (PDCCH). The PDCCH masked with RA-RNTI may be transmitted only through a common search space. Once the UE receives a scheduling signal masked with the RA-RNTI, the UE may receive the RAR message on the PDSCH indicated by the scheduling information. Thereafter, the UE checks whether there is RAR information indicated to the UE in the RAR message. The presence of RAR information for the UE may be determined by checking whether there is a random access preamble ID (RAID) for the preamble transmitted by the UE. The RAR information includes timing offset information (e.g., timing advance command (TAC)) for UL synchronization, UL scheduling information (e.g., UL grant), and UE temporary identification information (e.g., temporary-C-RNTI (TC-RNTI)). Upon receiving the RAR information, the UE may transmit Msg3 (e.g., RRC connection request message) on the PUCCH based on the UL grant in the RAR (S610). Msg3 may include a UE identity for contention resolution. Thereafter, the BS may transmit a contention resolution message (Msg4) (S620). Msg4 may include an RRC connection setup message.

SSB(Synchronization Signal Block) Transmission and Related Operations

Figure 7:
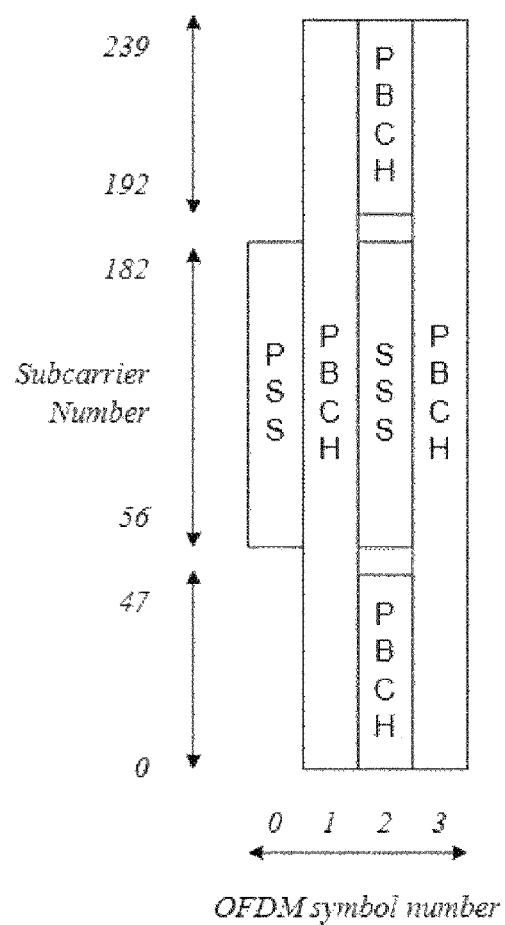
FIGS. 7 to 12 illustrate structures and operations of a synchronization signal block (SSB).

FIG. 7 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 7, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 4 below.

TABLE 4

| Type of Signals | | Operations |
|---|---|---|
| $1^{st}$ step | PSS | * SS/PBCH block (SSB) symbol timing acquisition<br>* Cell ID detection within a cell ID group (3 hypothesis) |
| $2^{nd}$ Step | SSS | * Cell ID group detection (336 hypothesis) |
| $3^{rd}$ Step | PBCH DMRS | * SSB index and Half frame (HF) index (Slot and frame boundary detection) |
| $4^{th}$ Step | PBCH | * Time information (80 ms, System Frame Number (SFN), SSB index, HF)<br>* Remaining Minimum System Information (RMSI) Control resource set (CORESET)/ Search space configuration |
| $5^{th}$ Step | PDCCH and PDSCH | * Cell access information<br>* RACH configuration |

FIG. 8 illustrates SSB transmission.

An SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 fora carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Beam Alignment

Figure 9:
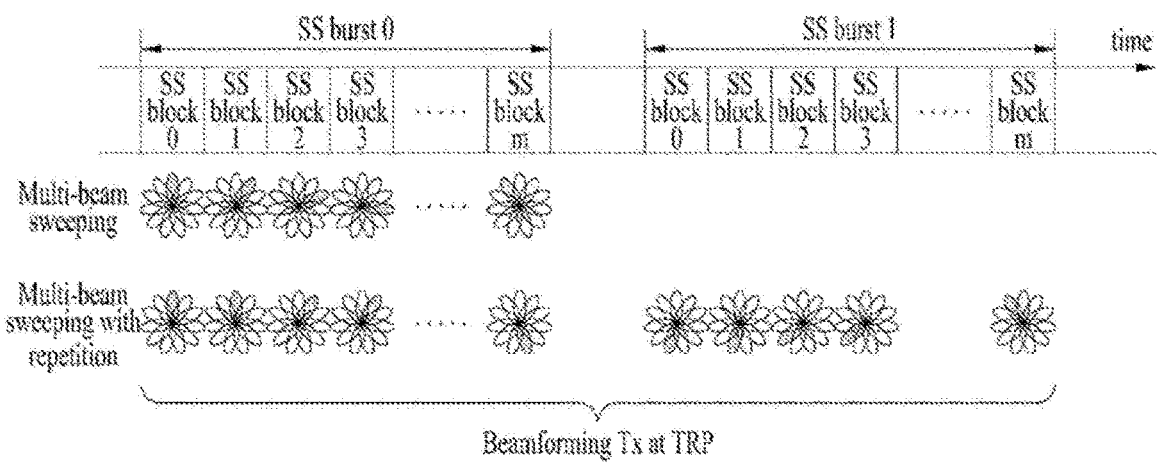

FIG. 9 illustrates exemplary multi-beam transmission of SSBs.

Figure 10:
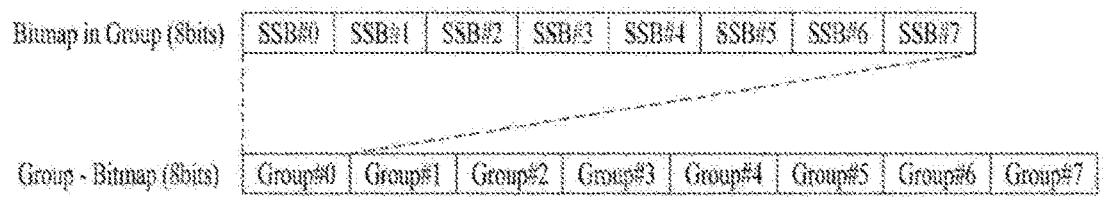

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Measurement and Rate Matching

FIG. 10 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 10. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

System Information Acquisition

Figure 11:
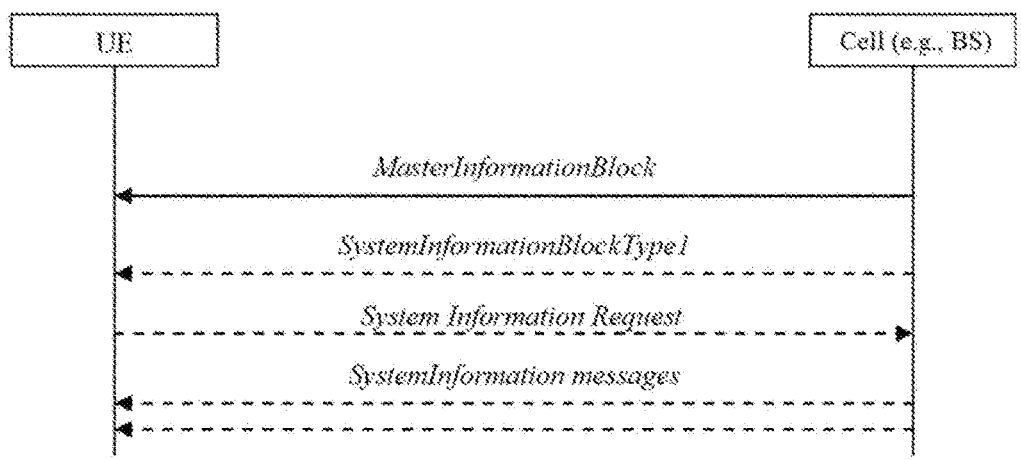

FIG. 11 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

The SI is divided into an MIB and a plurality of system information blocks (SIBs). SI other than the MIB may be referred to as remaining minimum system information (RMSI). For details, the following may be referred to.

The MIB includes information/parameters related to reception of SYstemInformaitonBlockType1 (SIB1) and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. SIB1 is transmitted on a PDSCH. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Figure 12:
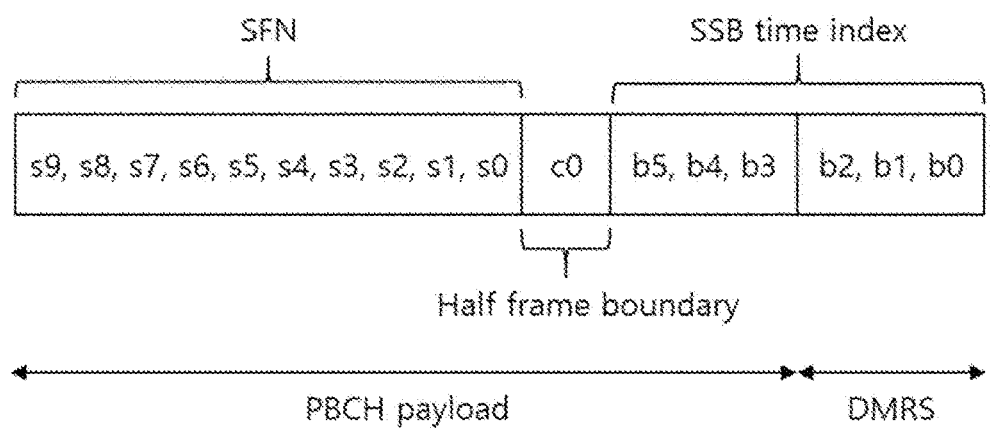

FIG. 12 illustrates acquisition of DL time synchronization information at a UE.

The UE may acquire DL synchronization by detecting an SSB. The UE may identify the structure of an SSB burst set based on the index of the detected SSB and thus detect a symbol/slot/half-frame boundary. The number of a frame/half-frame to which the detected SSB belongs may be identified by system frame number (SFN) information and half-frame indication information.

Specifically, the UE may obtain 10-bit SFN information s0 to s9 from the PBCH. 6 bits out of the 10-bit SFN information are obtained from a master information block (MIB), and the remaining 4 bits are obtained from a PBCH transport block (TB).

The UE may then obtain 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may obtain an SSB index based on the DMRS sequence and PBCH payload. SSB candidates are indexed with 0 to L−1 in a time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

Discontinuous Reception (DRX) Operation

The UE may perform a DRX operation, while performing the afore-described/proposed procedures and/or methods. A UE configured with DRX may reduce power consumption by discontinuously receiving a DL signal. DRX may be performed in an RRC_IDLE state, an RRC_INACTIVE state, and an RRC_CONNECTED stated. DRX is used for discontinuous reception of a paging signal in the RRC_IDLE state and the RRC_INACTIVE state. Now, DRX performed in the RRC_CONNECTED state (RRC_CONNECTED DRX) will be described below.

Figure 13:
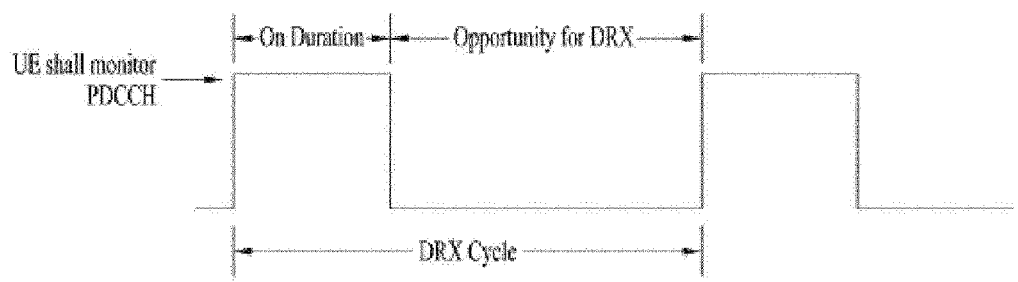
FIG. 13 is a diagram for explaining an embodiment of discontinuous reception (DRX) operation.

FIG. 13 is a diagram illustrating a DRX cycle (RRC_CONNECTED state).

Referring to FIG. 13, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 5 describes a UE operation related to DRX (in the RRC_CONNECTED state). Referring to Table 3, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 13.

TABLE 5

| | Type of signals | UE procedure |
|---|---|---|
| 1st step | RRC signalling(MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.—Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

ACK/NACK Transmission

Figure 14:
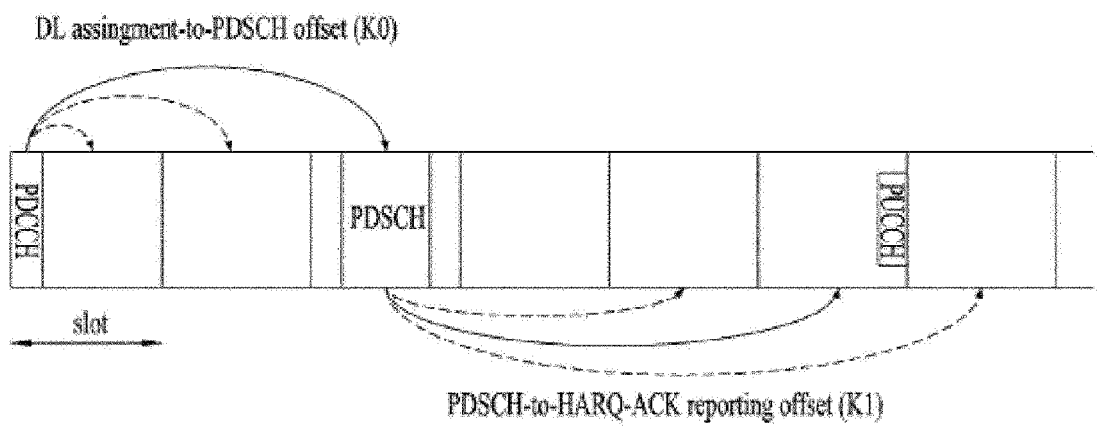
FIG. 14 illustrates an acknowledgment/negative-acknowledgement (ACK/NACK) transmission process.

FIG. 14 illustrates an ACK/NACK transmission process. Referring to FIG. 14, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 15:
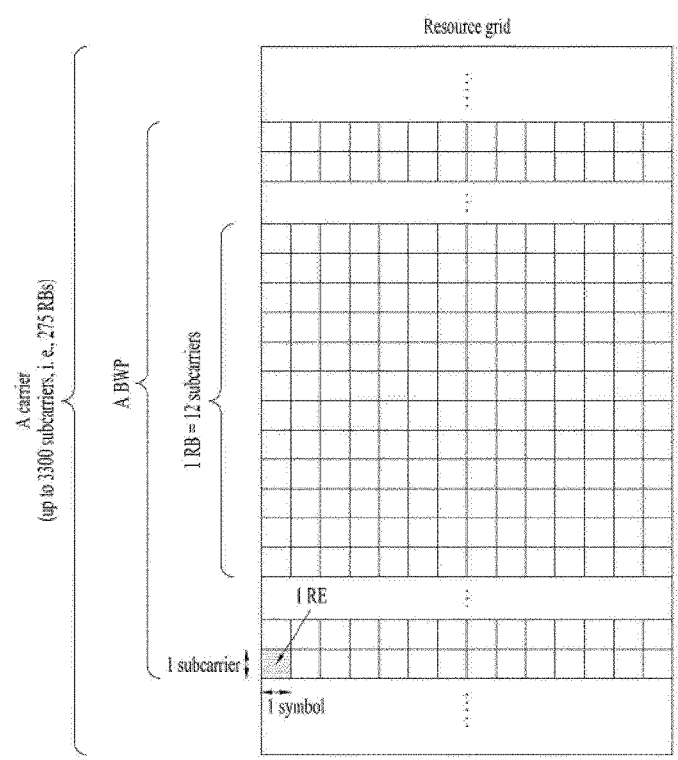
FIG. 15 illustrates the resource gird of a slot.

FIG. 15 illustrates a resource gird of a slot. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 16:
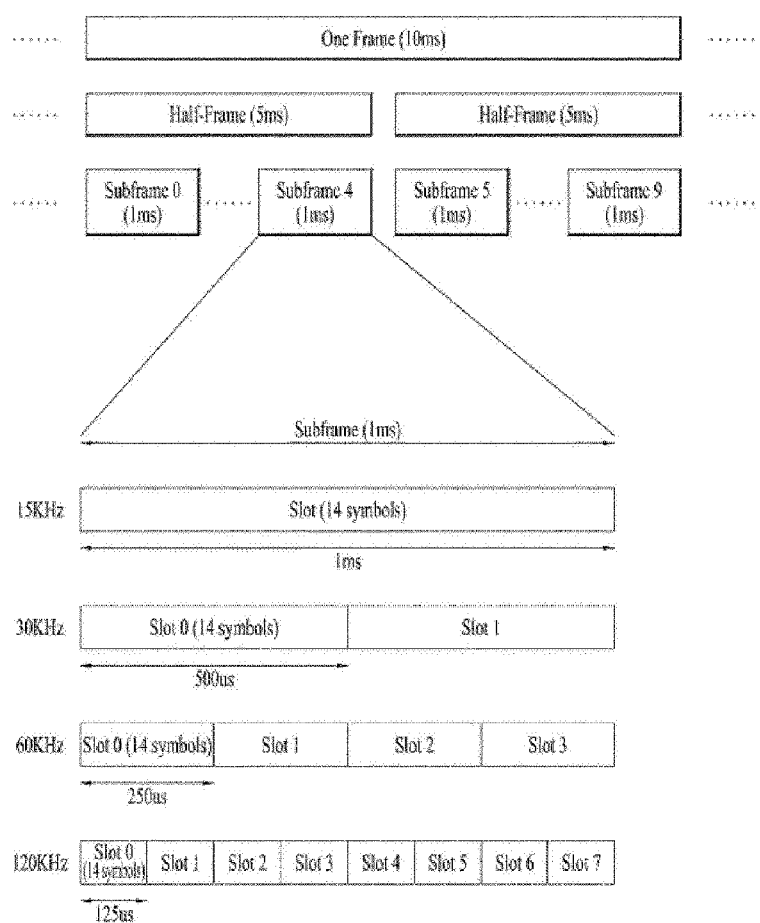
FIG. 16 illustrates the structure of a radio frame.

FIG. 16 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 6 exemplarily illustrates that the number of symbols per slot, the number of slots per frame, and the number of slots per subframe vary according to SCSs in a normal CP case.

TABLE 6

| SCS (15 * 2^μ) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 7 illustrates that the number of symbols per slot, the number of slots per frame, and the number of slots per subframe vary according to SCSs in an extended CP case.

TABLE 7

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 17:
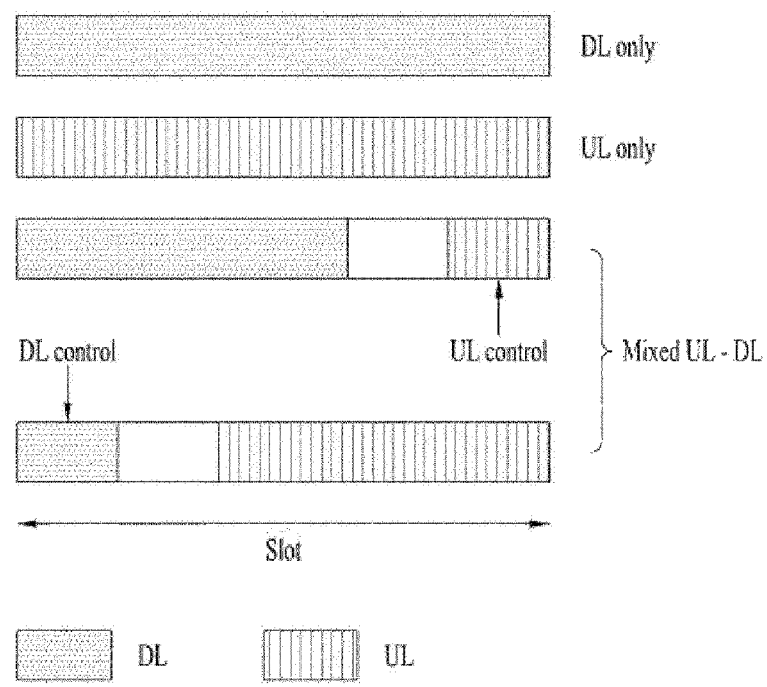
FIG. 17 illustrates the structure of a self-contained slot.
Figure 18:
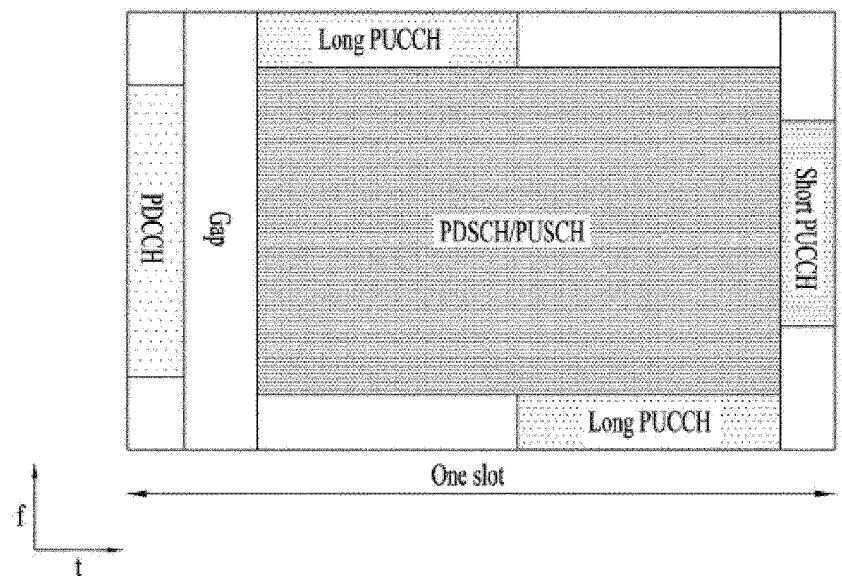
FIG. 18 illustrates an example of mapping physical channels to a self-contained slot.

FIG. 17 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region
DL control region+GP+UL region
DL region: (i) DL data region, (ii) DL control region+DL data region
UL region: (i) UL data region, (ii) UL data region+UL control region FIG. 17 illustrates mapping of a physical channel within a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

CSI Related Procedure

In the new radio (NR) system, the CSI-RS is used for time/frequency tracking, CSI computation, reference signal received power (RSRP) computation, or mobility. Here, the CSI computation is related to CSI acquisition, and the RSRP computation is related to beam management (BM).

Figure 19:
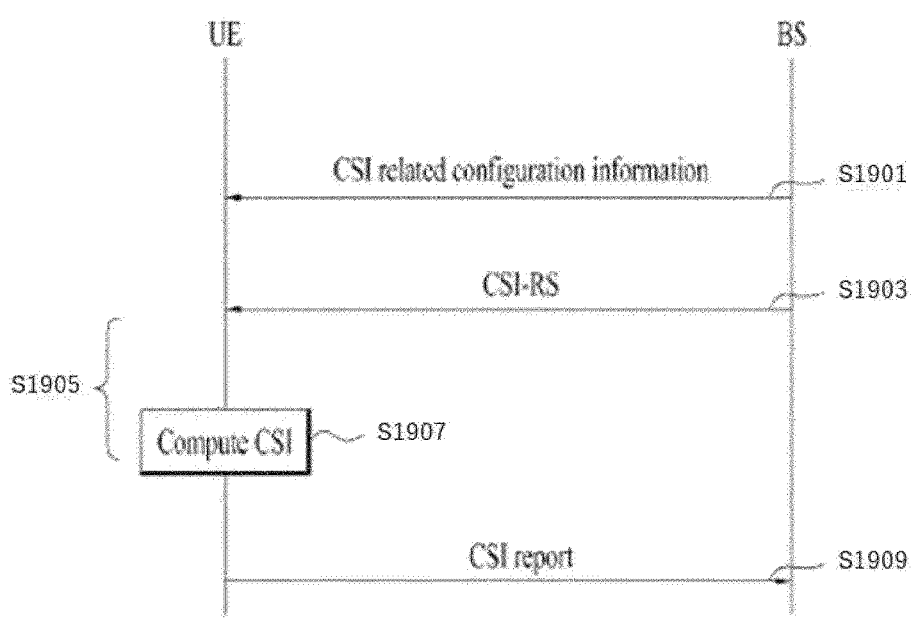
FIG. 19 is a diagram for explaining an example of channel state information reporting.

FIG. 19 is a flowchart illustrating a CSI related procedure.

For one of the CSI-RS purposes, the UE receives CSI related configuration information from a BS through RRC signaling (S1901).

The CSI related configuration information may include at least one of CSI interference management (IM) resource related information, CSI measurement configuration related information, CSI resource configuration related information, CSI-RS resource related information, or CSI report configuration related information.

i) The CSI-IM resource related information may include CSI-IM resource information, CSI-IM resource set information, etc. A CSI-IM resource set is identified by a CSI-IM resource set ID, and one resource set includes at least one CSI-IM resource. Each CSI-IM resource is identified by a CSI-IM resource ID.

ii) The CSI resource configuration related information may be defined as CSI-ResourceConfig IE. The CSI resource configuration related information defines a group including at least one of a non-zero power (NZP) CSI-RS resource set, a CSI-IM resource set, or a CSI-SSB resource set. That is, the CSI resource configuration related information includes a list of CSI-RS resource sets, and the CSI-RS resource set list may include at least one of a NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

To indicate the purpose of the CSI-RS for each NZP CSI-RS resource set, parameters (e.g., 'repetition' parameter related to BM, 'trs-Info' parameter related to tracking) may be configured iii) The CSI report configuration related information includes the parameter reportConfigType indicative of a time domain behavior and the parameter reportQuantity indicative of a CSI related quantity to be reported. The time domain behavior may be periodic, aperiodic, or semi-persistent.

The UE measures CSI based on the CSI related configuration information (S1905). The CSI measurement may include: (1) receiving the CSI-RS by the UE (S1903) and (2) computing the CSI based on the received CSI-RS (S1907). Regarding the CSI-RS, RE mapping of CSI-RS resources is performed in the time and frequency domains by the RRC parameter CSI-RS-ResourceMapping.

The UE reports the measured CSI to the BS (S1909).

1. CSI Measurement

The NR system supports more flexible and dynamic CSI measurement and reporting. The CSI measurement may include receiving a CSI-RS and acquiring CSI by measuring the received CSI-RS.

As time domain behaviors for the CSI measurement and reporting, channel measurement (CM) and interference measurement (IM) are supported.

A CSI-IM-based IM resource (IMR) of NR has a design similar to CSI-IM of LTE, and it is configured independently of ZP CSI-RS resources for PDSCH rate matching.

The BS transmits a NZP CSI-RS to the UE on each port of the configured NZP CSI-RS-based IMR.

If there is no PMI or RI feedback for a channel, a plurality of resources may be configured in a set, and the BS or network may indicate a subset of NZP CSI-RS resources for channel/interference measurement through DCI.

Hereinafter, a resource setting and resource setting configuration will be described in detail.

1. 1. Resource Setting

Each CSI resource setting CSI-ResourceConfig includes a configuration of S≥1 CSI resource sets (which is given by the RRC parameter csi-RS-ResourceSetList). Here, the CSI resource setting corresponds to a CSI-RS resource set list, S denotes the number of configured CSI-RS resource sets, and the configuration of S≥1 CSI resource sets includes each CSI resource set including CSI-RS resources (composed of the NZP CSI-RS or CSI-IM) and SSB resources used for RSRP computation.

Each CSI resource setting is positioned in a DL BWP identified by the RRC parameter bwp-id. All CSI resource settings linked to a CSI reporting setting have the same DL BWP.

The time domain behavior of CSI-RS resources within the CSI resource setting included in CSI-ResourceConfig IE may be indicated by the RRC parameter resourceType. In this case, the time domain behavior may be configured to be aperiodic, periodic, or semi-persistent.

One or more CSI resource settings may be configured for channel measurement (CM) and interference measurement (IM) by RRC signaling. A NZP CSI-RS for CSI acquisition may be a channel measurement resource (CMR), and a NZP CSI-RS for CSI-IM and IM may be an interference measurement resource (IMR). In this case, the CSI-IM (or a ZP CSI-RS for IM) may be primarily used for inter-cell interference measurement, and the NZP CSI-RS for IM may be primarily used for intra-cell interference measurement between multiple users.

The UE may assume that CSI-RS resource(s) for channel measurement and CSI-IM/NZP CSI-RS resource(s) for interference measurement configured for one CSI report is 'QCL-TypeD' resource-wise.

1. 2. Resource Setting Configuration

A resource setting may mean a resource set list. One reporting setting may be linked to up to three resource settings.

When one resource setting is configured, a resource setting (given by the RRC parameter resourcesForChannelMeasurement) is for channel measurement for RSRP computation.

When two resource settings are configured, the first resource setting (given by the RRC parameter resourcesForChannelMeasurement) is for channel measurement, and the second resource setting (given by csi-IM-ResourcesForInterference or nzp-CSI-RS-ResourcesForinterference) is for interference measurement performed on the CSI-IM or NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement, and the second resource setting (given by the RRC layer parameter csi-IM-ResourcesForInterference) is used for interference measurement performed on the CSI-IM.

1. 3. CSI Computation

If interference measurement is performed on the CSI-IM, each CSI-RS resource for channel measurement is resource-wise associated with a CSI-IM resource in the ordering of CSI-RS resources and CSI-IM resources in a corresponding resource set. The number of CSI-RS resources for channel measurement is the same as the number of CSI-IM resources.

For CSI measurement, the UE assumes the following.

Each NZP CSI-RS port configured for interference measurement corresponds to an interference transmission layer.

All interference transmission layers on NZP CSI-RS ports for interference measurement take into account energy per resource element (EPRE) ratios.

Different interference signals are assumed on RE(s) of an NZP CSI-RS resource for channel measurement, an NZP CSI-RS resource for interference measurement, or a CSI-IM resource for interference measurement.

2. CSI Reporting

For CSI reporting, the BS controls time and frequency resources available for the UE.

For the CQI, PMI, CRI, SSBRI, LI, RI, and RSRP, the UE may receive RRC signaling containing N≥1 CSI-ReportConfig reporting settings, M≥1 CSI-ResourceConfig resource settings, and one or two lists of trigger states (provided by aperiodicTriggerStateList and semiPersistentOnPUSCH-TriggerStateList). Each trigger state in aperiodicTriggerStateList contains a list of associated CSI-Report-Configs indicating resource set IDs for channel and optionally for interference. Each trigger state in semiPersistentOnPUSCH-TriggerStateList contains one associated CSI-ReportConfig.

For each CSI-RS resource setting, the UE transmits to the BS a CSI report indicated by CSI-ReportConfigs associated with a corresponding CSI resource setting. For example, the UE may report at least one of the CQI, PMI, CRI, SSBRI, LI, RI, and RSRP as indicated by CSI-ReportConfigs associated with the corresponding CSI resource setting. However, if CSI-ReportConfigs associated with the corresponding CSI resource setting indicates 'none', the UE may not report CSI or RSRP associated with the corresponding CSI resource setting. The CSI resource setting may include resources for an SS/PBCH block.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 20:
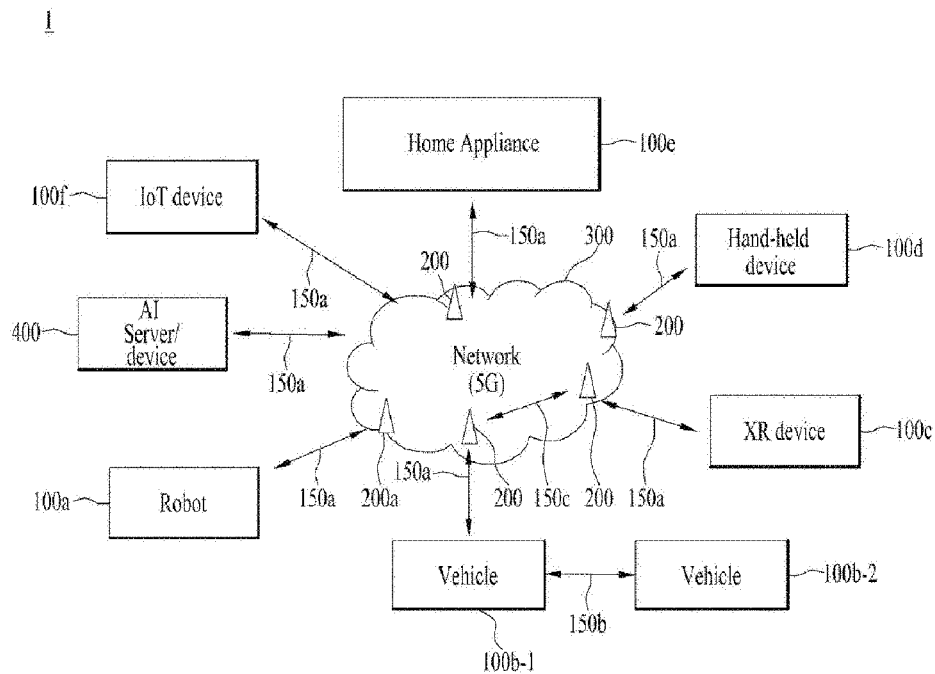
FIGS. 20 to 24 illustrate systems and communication devices to which methods proposed in the present disclosure are applicable.

FIG. 20 illustrates a communication system 1 applied to the present disclosure.

Referring to FIG. 20, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 21:
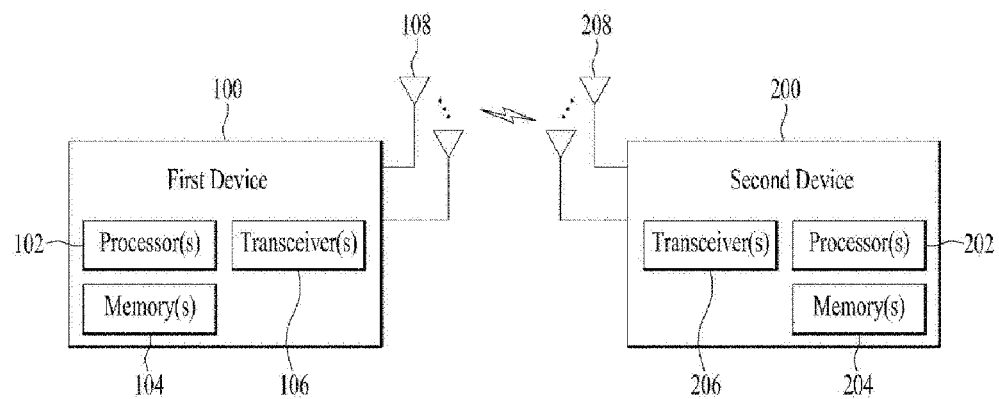

FIG. 21 illustrates wireless devices applicable to the present disclosure.

Referring to FIG. 21, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

Specifically, the one or more processors 102 and 202 of a UE receiving a DL signal in a wireless communication system may obtain a minimum CSI-RS triggering offset applicable to a CSI-RS for aperiodic CSI based on reception of a minimum slot interval applicable to scheduling of a PDCCH and a PDSCH.

After obtaining the applicable minimum CSI-RS triggering offset, the one or more processors 102 and 202 may control the transceivers 106 and 206 to receive DCI triggering the aperiodic CSI.

After receiving the DCI, the one or more processors 102 and 202 may obtain information about a second slot configured based on a first slot in which the DCI is received and the applicable minimum CSI-RS triggering offset.

After obtaining the information about the second slot, the one or more processors 102 and 202 may not perform buffering for the CSI-RS for a time interval between the first and second slots.

The one or more processors 102 and 202 may control the transceivers 106 and 206 to receive the CSI-RS for the aperiodic CSI at a time after the second slot.

Further, the one or more processors 102 and 202 may perform operations for various embodiments of the present disclosure or combination thereof The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 22:
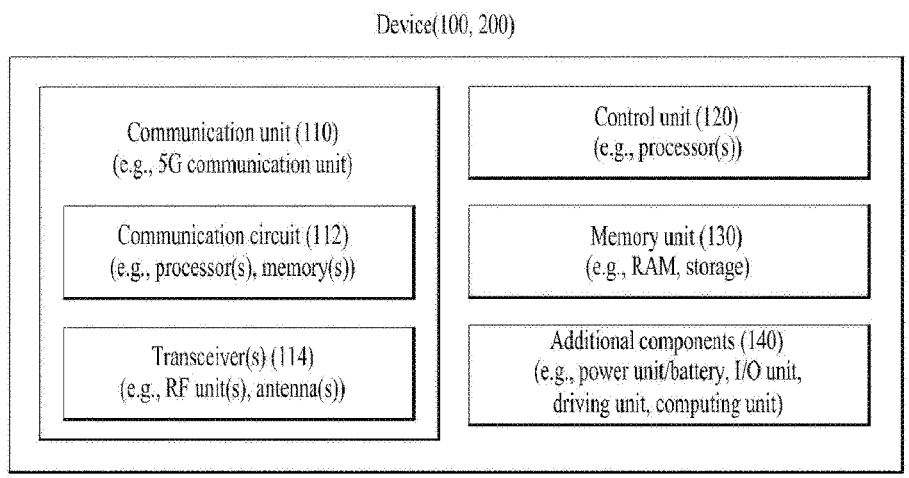

FIG. 22 illustrates another example of a wireless device applied to the present disclosure. The wireless device may be implemented in various forms according to a use case/service (refer to FIG. 21).

Referring to FIG. 22, wireless devices 100 and 200 may correspond to the wireless devices 100 and 200 of FIG. 21 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcasting terminal, a hologram device, a public safety device, an MTC device, a medical device, a FinTech device (or a finance device), a security device, a climate/environment device, the AI server/device (400 of FIG. 20), the BSs (200 of FIG. 20), a network node, or the like. The wireless device may be mobile or fixed according to a use case/service.

In FIG. 22, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 23:
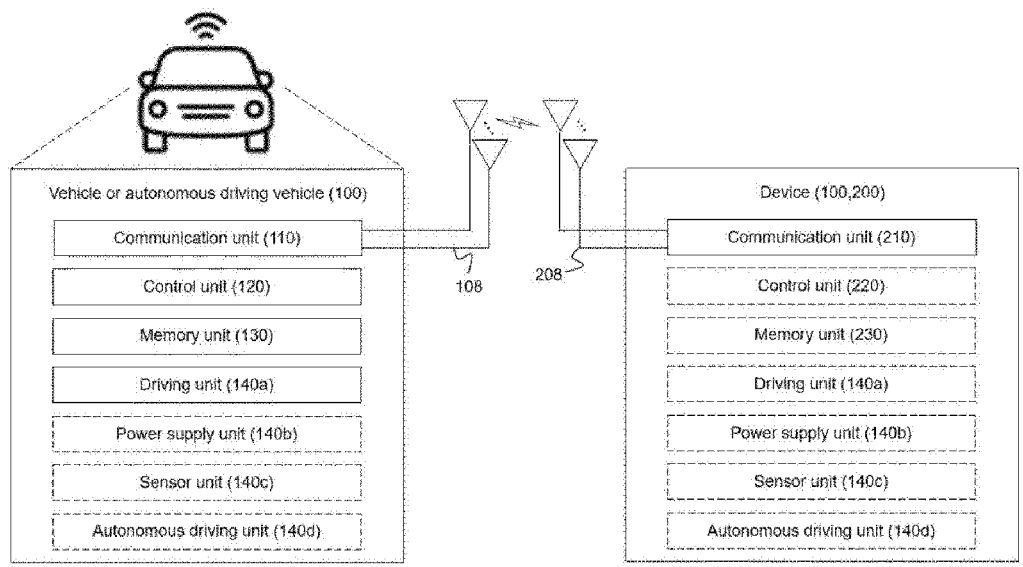

FIG. 23 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Figure 24:
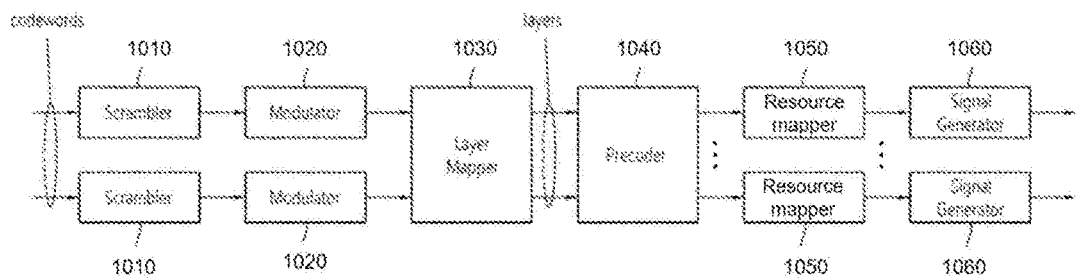

FIG. 24 illustrates a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 31 may be performed, without being limited to, the processors 102 and 202 and/or the transceivers 106 and 206 of FIG. 21. Hardware elements of FIG. 24 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 27.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device.

The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Power Saving in DL Signal Processing

The amount of power required to receive a DL signal and perform subsequent processes such as decoding may vary depending on the implementation of the UE. For example, a radio frequency (RF) circuit needs to be in operation to receive a DL signal, and a baseband circuit needs to be in operation to perform signal processing after the reception.

The power consumed by the UE to receive and process a DL signal may vary depending on to the implementation capability or situation of the UE. For example, while receiving a specific DL signal, the UE may perform processing (e.g., detection or decoding) of another DL signal at the same time. As another example, the UE may only process a specific DL signal, which has already been received, without receiving other DL signals. As a further example, the UE may perform only minimal operations such as maintaining synchronization and/or maintaining memory for reception and processing of a DL signal to be received in the future, without performing other operations at the moment.

The power consumption of the UE may be different in each of the aforementioned examples, and thus the UE may perform appropriate reception and/or processing operations in consideration of the state of the UE and/or the traffic state of signals to be processed by the UE in order to efficiently manage the power consumption. Herein, a state in which the UE prepares receiving and processing a DL signal in the future in order to manage the power consumption is referred to as a 'micro sleep' state, for convenience of description. Hereinafter, methods for efficiently supporting the micro sleep of the UE will be described. The methods proposed below may be performed after the UE and BS prepare a transmission/reception state through an initial access procedure. In addition, whether information transmitted and received between the UE and BS is used after operations based on the proposed methods and/or details of the information may be configured by higher layers.

The methods for supporting the micro sleep may allow the UE to prepare for reception and processing of a PDSCH related to a PDCCH. Alternatively, the methods for supporting the micro sleep may be related to an aperiodic CSI-RS that the UE receives after configuring a measurement resource through a UL grant in the PDCCH. However, the present disclosure is not limited thereto, and the methods of supporting the micro sleep may be similarly applied to other DL signals other than the PDSCH or CSI-RS.

Embodiment 1: Method of Indicating Period in which Buffering is Restricted

When reception of a PDSCH is scheduled by a PDCCH, it may be considered that the UE is configured with a small transmission timing interval between the PDCCH and PDSCH associated therewith to avoid latency in signal transmission and reception. For example, PDSCH transmission may start immediately after the last symbol in which the PDCCH is transmitted, or PDCCH and PDSCH transmission may start in the same symbol.

Upon receiving the PDCCH, the UE may decode the received PDCCH and transfer DCI included in the PDCCH to higher layers and interpret the information. The PDCCH processing including the DCI transfer and interpretation may take a period of several symbols. If the BS transmits the PDSCH before the UE completes the PDCCH processing, the UE may need to store DL signals in a buffer through PDCCH buffering. That is, the UE may need to receive the PDSCH through an RF circuit during the PDCCH processing, and store the PDSCH received through a baseband circuit or the PDSCH partially processed until the UE starts/performs PDSCH processing.

On the other hand, if the UE is guaranteed to receive the PDSCH after completing the PDCCH processing, the UE may not need to perform the PDSCH buffering separately and control the circuits based on the frequency range and transmission method determined to be suitable for PDSCH reception based on information included in the DCI of the processed PDCCH. That is, if the UE knows that the PDSCH is received after completion of the PDCCH processing, the UE may save power by restricting or skipping the PDSCH buffering. In this case, the UE may efficiently manage the power consumption by turning off the RF circuit or operating the RF circuit with minimum power during the PDCCH processing.

The above-mentioned PDSCH buffering omission or restriction scheme may be performed based on that the BS indicates the starting time of the PDSCH reception or the interval between the PDCCH and PDSCH reception through appropriate time-domain resource allocation (TDRA). Here, the TDRA may indicate 1) an index of K0 corresponding to the interval between a slot in which the PDCCH is transmitted and a slot in which the PDSCH is transmitted, 2) a starting and length indicator value (SLIV) corresponding to the starting and ending symbol indices or the symbol length of the slot in which the PDSCH is transmitted, or 3) a combination of K0 and SLIV.

For example, the BS may indicate that the value of K0 is more than or equal to 1 in order to inform the UE that the PDSCH reception starts in a slot after the slot in which the PDCCH reception is performed and/or indicate that the starting symbol index of the SLIV is 5 (even when K0=0) in order to inform the UE that the PDSCH reception starts after 5 symbols from the last symbol of the PDCCH transmission. In this case, the UE may not perform the PDSCH buffering during the PDCCH processing, that is, may skip or restrict the PDSCH buffering until the indicated starting time of the PDSCH reception.

TDRA candidate values for stably securing the PDCCH processing time of the UE may be configured by RRC or indicated by DCI. However, when the PDSCH buffering is skipped or restricted until a PDSCH transmission starting time indicated by a TDRA candidate value, if such a method is applied to all candidate values, the PDSCH reception of the UE may be delayed, and thus throughput loss may occur. To prevent such a problem, the following methods may be considered to adjust the PDSCH buffering of the UE more flexibly.

(1) Minimum Candidate Values

The UE may receive from the BS 1) the value of K0 corresponding to the minimum slot interval between the slots for receiving the PDCCH and PDSCH among TDRA candidate values, 2) a minimum starting symbol index indicating the earliest PDSCH reception time as the SLIV value, or 3) a minimum combination of K0 or SLIV values. That is, the BS may indicate to the UE indices corresponding to the minimum interval between the PDCCH and PDSCH reception in the unit of slot or symbol among the TDRA candidate values. In this case, the UE may not perform or may restrict the PDSCH buffering before a PDSCH reception time indicated by the indices. Alternatively, the UE may not expect to receive the PDSCH before the PDSCH reception time indicated by the indices.

In this case, the above-described minimum value indication method may be similarly applied even when the UE configures a measurement resource based on a UL grant in the PDCCH and receives an aperiodic CSI-RS. When aperiodic CSI reporting is triggered by the UL grant, the UE may not receive signals for channel or interference measurement by using the minimum value of K0 and/or SLIV. When the UE is configured with the value of K0 corresponding to the minimum interval between the slots for receiving the PDCCH and PDSCH as described above, the UE may attempt to restrict or skip buffering for signals such as the CSI-RS by considering and configuring the value of K0 as an applicable aperiodic CSI-RS triggering offset. In this case, the UE may skip or restrict the buffering for the signals such as the CSI-RS for a time period between a time when DCI for triggering aperiodic CSI is received and a time indicated by a triggering offset value more than or equal to an applicable minimum aperiodic CSI-RS triggering offset.

For example, the UE may not receive signals such as a CSI-IM, an SSB, etc. including the CSI-RS during the interval between the PDCCH and PDSCH reception configured by K0 and/or SLIV. Here, no signal reception by the UE may mean that the UE receives no signals regardless of whether the BS transmits signals or that the BS does not transmit any signals. When K0 indicates the minimum slot interval, the UE may implicitly set the aperiodic CSI-RS triggering offset value for an active DL BWP to be equal to the value of K0 and receive the CSI-RS based thereon.

(2) Several Restricted Sets According to Specific Standard

The UE may receive a restricted set including some candidate values among TDRA candidate values from the BS. Here, each TDRA candidate value may be configured in a row including indices for indicating K0, SLIV, and/or PDSCH mapping types, and the restricted set may include several rows. For example, the BS may configure a threshold for identifying indices included in the rows and provide the threshold to the UE, and the UE may configure the restricted set based on whether the indices included in the rows are more/less than or equal to or more/less than the corresponding threshold. When the restricted set is configured, the UE may expect no PDSCH transmission or perform no PDSCH buffering until a PDSCH transmission starting time indicated by TDRA candidate values included in the restricted set or during a time period corresponding to the interval between the PDCCH and PDSCH reception indicated by the candidate values. For example, if the row of any TDRA candidate value included in the restricted set indicates K0=1 and starting symbol index of SLIV=4, the UE may not perform the PDSCH buffering during a period from the last symbol used for receiving the PDCCH in a slot in which the PDCCH is received to the fourth symbol in the next slot. Here, regarding the row indicating K0=1 and start symbol index of SLIV=4, any one or more indices included in the row may be more/less than or equal to or more/less than a predetermined threshold so that the indices may be included in the restricted set.

On the contrary, the UE may expect no PDSCH transmission or perform no PDSCH buffering until a PDSCH transmission starting time indicated by the remaining TDRA candidate values except the restricted set or during a time period corresponding to the interval between the PDCCH and PDSCH reception indicated by the remaining candidate values. That is, the UE may perform the PDSCH buffering for the time period indicated by the TDRA candidate values included in the restricted set and may perform no PDSCH buffering for the time period indicated by the remaining TDRA candidate values other than the restricted set.

When the UE receives from the BS the applicable minimum slot interval K0 for indicating the minimum slot interval between the PDCCH and PDSCH reception, the UE may expect that candidate values having slot interval indices smaller than the applicable minimum value K0 among the TDRA candidate values are not included in the restricted set or that the candidate values are invalid in order to restrict the PDSCH buffering. Accordingly, the UE may attempt to receive the PDSCH based on TDRA candidate values having slot interval indices greater than the applicable minimum value K0.

In addition, the above-described restricted set indication method may be similarly applied even when the UE configures a measurement resource based on a UL grant in the PDCCH and receives an aperiodic CSI-RS. When aperiodic CSI reporting is triggered by the UL grant, the UE may not receive signals for channel or interference measurement within the time period indicated by the TDRA candidate values included in the restricted set. For example, the UE may not receive signals such as a CSI-IM, an SSB, etc. including the CSI-RS until a PDSCH reception starting time configured by K0 and/or SLIV included in the TDRA candidate values included in the restricted set or during an interval between reception of DCI triggering the aperiodic CSI reporting and the PDSCH reception. On the contrary, the UE may not receive the signals such as the CSI-RS until the PDSCH reception starting time configured by K0 and/or SLIV included in the remaining TDRA candidate values other than the restricted set or during the interval between the reception of the DCI triggering the aperiodic CSI reporting and the PDSCH reception. Here, no signal reception by the UE may mean that the UE receives no signals regardless of whether the BS transmits such signals or that the BS transmits no signals.

For example, when the UE is configured with the value of K0 corresponding to the minimum interval between the slots for receiving the PDCCH and PDSCH as described above, the UE may consider and configure the same value as K0 as an applicable minimum aperiodic CSI-RS triggering offset. In this case, the signals such as the CSI-RS may be received based on aperiodic CSI-RS triggering offsets more than or equal to K0 or a set of the offsets. That is, the UE may determine aperiodic CSI-RS triggering offsets less than K0 or the offset set to be invalid, and expect to receive no CSI-RS in the aperiodic CSI-RS triggering offsets less than K0 or the set of the offsets.

(3) Whether Buffering is Performed

The UE may be instructed by the BS whether to perform the PDSCH buffering, instead of determining whether to perform the PDSCH buffering based on reception of a certain index from the BS. When the UE is instructed by the BS to skip or restrict the PDSCH buffering, the UE may not perform the PDSCH buffering after the last symbol in which the PDCCH is received. For example, a period in which the UE skips the PDSCH buffering may be 1) a period from the last symbol in which the PDCCH is received to the last symbol in a slot in which the corresponding PDCCH is received or 2) a time period from the last symbol in which the PDCCH is received to a time predefined by higher layer signaling such as Threshold-Sched-Offset. In this case, PDSCH processing may be configured to be performed after PDCCH processing including decoding, DCI transfer and interpretation, and so on are all performed. When the UE is instructed by the BS not to perform the PDSCH buffering, the UE may expect no PDSCH transmission even though the UE receives information such as TDRA indicating the PDSCH buffering.

Similarly, the above-described method of indicating whether the buffering is performed may be similarly applied even when the UE configures a measurement resource based on a UL grant in the PDCCH and receives an aperiodic CSI-RS. When aperiodic CSI reporting is triggered by the UL grant, the UE may be instructed not to process signals such as the CSI-RS, etc. In this case, the UE may not perform buffering for the signals such as the CSI-RS 1) for a period from the last symbol in which the PDCCH is received to the last symbol in a slot in which the corresponding PDCCH is received or 2) for a time period from the last symbol in which the PDCCH is received to a time predefined by higher layer signaling such as Threshold-Sched-Offset.

Embodiment 2: Additional Operation for Restricting Buffering

Even if the UE is configured to perform no PDSCH buffering before a specific time or during a predetermined time period according to information indicated by the BS, the BS may start PDSCH transmission again. In this case, the UE may consider an additional adjustment method. Specifically, the UE may still not perform decoding or channel measurement for the corresponding PDSCH. Alternatively, by considering whether an additional DMRS is received or whether the DMRS is received after a specific time, the UE may perform no decoding or channel measurement for code blocks (CBs) of the PDSCH corresponding to the DMRS reception time or before the specific time but perform decoding or channel measurement only for the remaining CBs received after the specific time.

For example, the UE may drop transmission of a hybrid automatic repeat request-acknowledge (HARQ-ACK) for a PDSCH received during a time period in which no PDSCH buffering is configured. Here, the HARQ-ACK transmission drop may mean that the UE transmits no HARQ-ACK for the received PDSCH or transmits a NACK as a reception result.

The dropped HARQ-ACK transmission may be HARQ-ACK transmission based on a transmission block (TB). For example, in the case of slot aggregation where a single TB is transmitted over several slots, the UE may be configured to perform no PDSCH buffering before a specific time. In this case, the UE may receive a part of the transmitted TB in a slot including the specific time or in the rest of the time domain except a time region before the specific time. That is, the UE may perform HARQ-ACK transmission only for a part of the TB transmitted after the specific time and may drop HARQ-ACK transmission for the rest of the TB transmitted before the specific time.

Alternatively, the dropped HARQ-ACK transmission may be CBG based HARQ-ACK transmission. For example, when a plurality of CBGs corresponding to a PDSCH transmitted by a BS are transmitted over several slot durations, the UE may be configured to perform no PDSCH buffering before a specific time. In this case, the UE may receive the transmitted CBGs in a slot including the specific time or in the rest of the time domain except a time region before the specific time. That is, the UE may perform HARQ-ACK transmission only for some CBGs transmitted after the specific time and may drop HARQ-ACK transmission for some CBGs transmitted before the specific time.

When the UE configures a measurement resource based on a UL grant in the PDCCH and receives signals such as an aperiodic CSI-RS, a CSI-IM, and/or an SSB, the UE may be configured to perform no buffering for the signals including the aperiodic CSI-RS before a specific time or during a predetermined time period according to information indicated by the BS as described above. However, although the UE is configured to perform no buffering for the signals including the aperiodic CSI-RS, the BS may transmit the signals including the aperiodic CSI-RS again. In this case, the UE may consider an additional adjustment method. The additional buffering adjustment method for the signals such as the aperiodic CSI-RS may be different from the additional PDSCH buffering adjustment method.

(1) Restriction of Available Aperiodic CSI Triggering States

The BS may instruct the UE not to use a non-zero CSI triggering state for a specific time period. The BS may provide information on restriction on use of the non-zero CSI triggering state to the UE through L1 signaling or higher layer signaling. Upon receiving the corresponding restriction information, the UE may not receive any information about measurement resources for a period configured by the BS for the UE or for a predetermined time period from the last symbol used for PDCCH reception to the first symbol in which the PUSCH is transmitted or the first symbol of a slot in which the PUSCH is transmitted. When the UE is configured not to use the non-zero CSI triggering state for the predetermined time period, the BS may not correctly receive CSI for the predetermined time period even though the BS transmits a signal such as an aperiodic CSI-RS.

As another method, the BS may instruct the UE to ignore a CSI triggering state or not to update CSI. That is, the UE may be configured to be unrelated to the CSI triggering state. Alternatively, even when the UE is configured to be related to the CSI triggering state, the UE may be configured to report CSI where the measurement results for measurement resources are not updated.

The above method may be performed in consideration of the state of the PUSCH, for example, whether the PUSCH multiplexes a transport block (TB) or ACK/NACK information. Alternatively, the above method may be performed differently depending on the number of CSI reports that the UE needs to transmit over the PUSCH. Alternatively, both the multiplexing of the TB or ACK/NACK information and the number of CSI reports to be transmitted may be considered. For example, when the PUSCH includes no TB or ACK/NACK information and when the number of CSI reports to be transmitted is one, the UE may not transmit the PUSCH. In addition, when the PUSCH includes the TB or ACK/NACK information or when the number of CSI reports is two or more, the UE may transmit the PUSCH without updating the CSI reports.

The BS may transmit restriction information to the UE so that the UE may ignore the CSI triggering state or not update the CSI. In this case, the corresponding restriction information may be transmitted through L1 signaling or higher layer signaling. Upon receiving the corresponding information, the UE may not receive any information about measurement resources for a period configured by the BS for the UE or for a time period from the last symbol used for PDCCH reception to the first symbol in which the PUSCH is transmitted or the first symbol of a slot in which the PUSCH is transmitted. When the UE is configured to ignore the CSI triggering state or perform no CSI update for the predetermined time period, the BS may not correctly receive CSI for the predetermined time period even though the BS transmits a signal such as an aperiodic CSI-RS.

As another method, when transmission of signals such as aperiodic NZP CSI-RS and/or CSI-IM for measurement is triggered by DCI, the UE may be configured to apply a value indicated by the BS as an aperiodic triggering offset for indicating the location of a slot for transmitting signals such as an aperiodic CSI-RS. That is, the BS may provide the UE with the aperiodic triggering offset through L1 signaling or higher layer signaling to allow the UE to receive the signals such as the aperiodic CSI-RS at a specific location. For example, even when the triggering offset for a specific aperiodic CSI triggering state is set to three slots, the BS may separately indicate a larger value such as 14 slots, and the UE may receive the signals such as the aperiodic CSI-RS in the 14 slots. In this case, even when the reception of the signals such as the aperiodic CSI-RS at the UE is limited to the three slots, the BS may correctly receive CSI by transmitting the corresponding signals on resources such as the 14 slots, which are separately indicated.

Aperiodic CSI reporting may be performed based on measurements based on a resource or SSB for a periodic or semi-persistent CSI-RS and/or CSI-IM. In addition, the UE may expect to receive no periodic or semi-periodic CSI-RS (and/or CSI-IM) in a resource section in which signals such as an aperiodic CSI-RS are incapable of being received. In this case, an aperiodic CSI report to be transmitted by the UE to the BS may not be updated or may be updated based on measurements except resources on which reception is restricted. If the UE is configured to perform measurement using only the most recent resource in advance, the UE may replace/consider valid resources before the resources on which reception is restricted with/as the most recent resource, performs measurement, and then transmit an updated CSI report.

Embodiment 3: Method of Applying Buffering Restriction

The reception of the restriction information provided by the BS for the above-described micro sleep and the restriction of the PDSCH buffering may be performed based on that PDCCH monitoring occasions start at the first symbol in a slot. Alternatively, the restriction information reception and PDSCH buffering restriction may be performed based on that the PDCCH monitoring occasions start at the middle or end of the slot depending on search space configurations. When the PDSCH buffering is restricted based on that the PDCCH monitoring occasions start at the middle or end of the slot, the interval between a time at which PDSCH reception starts and a time at which the PDCCH scheduling the PDSCH is transmitted (or monitoring occasions) may need to be considered. For example, when the restriction information is transmitted by indicating the interval between the PDCCH and PDSCH reception as the value of K0 and/or SLIV, K0 and/or SLIV may have a different value for each PDCCH monitoring occasion. In addition to the restriction information, an additional indication such as an offset indicating the symbol index in the slot where the monitoring occasions start for each PDCCH monitoring occasion may be applied.

Alternatively, the reception of the restriction information provided by the BS to support the micro sleep and the PDSCH buffering restriction performed according to the corresponding information may be applied only to a specific CORESET, a search space, a radio network temporary identifier (RNTI), and/or a scheduling carrier. In addition, the UE may be configured with restriction information for each CORESET, each search space, each RNTI, each scheduling carrier, and/or any combination thereof. For example, in the case of a common search space (CSS), only same-slot scheduling may be supported, and thus a broadcast message may be transmitted when the UE skips the PDSCH buffering. That is, if necessary, the UE may perform the PDSCH buffering for the CSS according to TDRA configurations regardless of the PDSCH buffering restriction information.

However, according to this method, if the CSS is configured for each slot, the PDSCH buffering may not be skipped or restricted. In order to solve the problem that the PDSCH buffering is not skipped or restricted, it may be considered that the UE performs the PDSCH buffering at the time of receiving DCI related to system information (SI), an RAR, and/or paging during the initial access, regardless of the reception of the restriction information. For example, when the UE recognizes SI change within an SI window or in paging DCI, when the UE transmits a PRACH and then receives an RAR in an RAR window, and/or when there is a paging occasion, the UE may perform the PDSCH buffering by ignoring the restriction information about the PDSCH buffering, which is transmitted by the BS. For another example, when the UE receives from the BS the applicable minimum slot interval K0 for indicating the minimum slot interval between the PDCCH and PDSCH reception, the UE may not apply the value of K0 to for the types of RNTIs and PDCCH search spaces shown in Table 8 below.

TABLE 8

| RNTI | PDCCH search space |
|---|---|
| SI-RNTI | Type0 common |
| SI-RNTI | Type0A common |
| RA-RNTI, TC-RNTI | Type1 common |
| P-RNTI | Type2 common |

As another method for solving the problem that the PDSCH buffering is not skipped or restricted, the UE may ignore the restriction information and perform the PDSCH buffering for the CSS and/or CORESET #0 even at a time when DCI related to a cell RNTI (C-RNTI), a configured scheduling RNTI (CS-RNTI), or a modulation coding scheme C-RNTI (MCS-C-RNTI) is transmitted. For the CSS and/or CORESET #0, since only the same-slot scheduling is supported, the TDRA setting may be the same as the broadcast message even if the C-RNTI is transmitted.

Each UE may have a different PDCCH processing time depending on the implementation of the UE, and therefore, the BS may require information about the UE to configure the PDSCH buffering restriction information for the UE. In this case, the UE may report information about itself to the BS for each numerology or SCS, depending on the number of times of blind decoding (BD) or the number of CCEs, and/or with respect to the maximum number of configurable CCEs.

For example, the UE reports the number of symbols required for PDCCH processing, a time in msec, or the minimum starting time of the PDSCH reception, which is related to the PDCCH, in order to provide information about itself to the BS. As another example, the UE may report a list of candidate values preferred by the UE among TDRA candidate values in order to transmit information about itself to the BS or report a specific candidate value, for example, a candidate value indicating the minimum starting time of the PDSCH reception, which is related to the PDCCH. As a further example, the UE may report to the BS whether to perform the PDSCH buffering for a specific time period or depending on a specific condition in order to transmit information about itself to the BS. In this case, the UE may report a specific time period required for the PDCCH processing. For example, the UE may report, as a PDSCH buffering restriction period, a time period from when the UE receives DCI and a PDCCH for DL and/or UL scheduling to when the UE receives DCI and a PDCCH for new DL and/or UL scheduling after a lapse of a predetermined time from the time when the UE received the DCI and PDCCH. The predetermined time may be reported by the UE in advance or configured by the BS.

The BS may restrict the PDSCH scheduling based on the reported information about the UE or provide the restriction information on the PDSCH buffering again to the UE. When the PDSCH buffering is restricted based on the UE's report, the UE and BS may restrict the PDSCH buffering after a lapse of a specific time from when the corresponding UE information is transmitted.

Embodiment 4: Method of Transmitting or Applying Information about Buffering Restriction Information on whether the PDSCH buffering is performed or restriction information on the PDSCH buffering based on the TDRA, which are transmitted from the BS to the UE, may be transmitted by a higher layer signal such as a medium access control (MAC) message. In this case, based on the information, the PDSCH buffering restriction may be applied after a lapse of specific microseconds from when the UE receives the corresponding MAC message As another method, the information on whether the PDSCH buffering is performed or the restriction information on the PDSCH buffering based on the TDRA may be transmitted to the UE through L1 signaling such as a DCI indication. In this case, depending on the periodicity of a PDCCH carrying the corresponding DCI, the PDSCH buffering may be restricted based on the information before transmission of next DCI. In addition, when the applicable minimum slot interval is enabled to configure a time period in which the buffering is restricted, the UE may be configured with the minimum value of K0 for an active DL BWP, K2 for an active UL BWP, and/or an aperiodic CSI-RS triggering offset through L1 signaling such as DCI (both when QCL-TypeD is configured or not configured).

As another method, the PDSCH buffering may be restricted within the active time of DRX operation in conjunction with the DRX operation. That is, when the UE performs the DRX operation, the UE may configure different TDRA candidate values or change whether to restrict the PDSCH buffering for each time period within the active time of the DRX operation. For example, when drx-onDurationTimer operates, the UE may apply the PDSCH buffering restriction or configure only a specific TDRA candidate value in the initial time period of the DRX cycle. Then, the UE may not apply the PDSCH buffering restriction or expect that PDSCH(s) corresponding to all TDRA candidate values will be transmitted after the initial time period.

When the PDSCH buffering is in conjunction with the DRX operation, an independent timer, which is different from that of the general DRX operation, may be configured. For example, the UE may be configured to restrict the PDSCH buffering at every first cycle of the DRX operation. Alternatively, when the UE successfully receives a PDCCH related to a specific PDSCH, the UE may be configured not to restrict the PDSCH buffering for a specific time period configured by the BS. In this case, the specific time period may be extended whenever the UE successfully receives the PDCCH. When the PDSCH buffering is in conjunction with the DRX operation, the UE may perform the PDSCH buffering based on the TDRA configuration for an operation period (while the drx-InactivityTimer operates) after the time when the PDCCH and/or PDSCH is actually received within the period in which drx-onDurationTimer operates (on duration). In other words, the UE may attempt to secure the maximum micro sleep period by considering that the PDCCH and/or PDSCH is not received at the beginning of the period in which drx-onDurationTimer operates (on duration). For example, the UE may perform the PDSCH buffering from the time when the PDCCH and/or PDSCH is actually received. Specifically, the UE may perform the PDSCH buffering until the drx-InactivityTimer expires or for the remaining DRX operation period. Alternatively, the UE may perform the PDSCH buffering based on a third timer. The UE may start the PDSCH buffering based on the third timer by operating the third timer after reception of the PDCCH and/or PDSCH. If the third timer reaches a threshold configured by the BS through higher layer signaling, the UE may stop or restrict the PDSCH buffering.

As another method, whether the UE restricts the PDSCH buffering may be determined differently for each BWP configured for the UE in conjunction with the BWP. For example, the BS may give the UE different indications of whether to restrict the PDSCH buffering for each BWP. Alternatively, the UE may be configured not to expect the PDSCH buffering in a default BWP implicitly.

As another method, the UE may autonomously determine whether to restrict the PDSCH buffering. In this case, the requirements of the UE need to be relaxed. For example, when the UE receives a PDCCH, the UE may skip the PDSCH buffering if the interval between the reception time of the corresponding PDCCH and the reception time of a PDCCH received immediately before the corresponding PDCCH is greater than or equal to a predetermined interval threshold. Specifically, the interval between the reception times may correspond to the interval between slots in which the PDCCHs are received or the symbol interval between the last symbol in which the previous PDCCH is received and the first symbol in which the UE receives the following PDCCH. In addition, the interval may vary depending on the capability of the UE, which may be reported to the BS in advance. If the interval between the reception time of a PDCCH to be received by the UE and the reception time of a PDCCH received immediately before the corresponding PDCCH is less than or equal to a predetermined interval threshold, the UE may expect to perform the PDSCH buffering. In this case, PDCCHs to be received by the UE may be classified according to DL and UL scheduling so that only a PDCCH for specific scheduling is configured to be valid for the reception interval calculation. Alternatively, all PDCCHs may be configured to be valid for the reception interval calculation without distinguishment between DL and UL. As another example, the UE may not perform or expect the PDSCH buffering for M times of PDCCH reception among N times of PDCCH reception.

When the PDSCH buffering is restricted or not performed, the UE may consider reducing the number of times of PDCCH blind decoding (BD) in order to reduce the time required for PDCCH processing. In other words, the UE may reduce the PDCCH processing time by reducing the number of times of BD, thereby securing more time for the micro sleep state. To this end, the UE may perform PDCCH monitoring only for some CORESETs, search spaces, CCE sets and/or DCI formats in order to reduce the number of times of BD. Alternatively, the UE may perform no PDCCH monitoring for some CORESETs, search spaces, CCE sets and/or DCI formats.

The signaling, conditions, and/or methods related to the presence or absence of the PDSCH buffering restriction described in the present disclosure may be extended and applied to a reception or transmission method for another UE. The BS may provide the UE with information on a combination of the number of layers and/or DMRS support ports for PDSCH transmission, and the UE may expect no PDSCH transmission for configurations other than the corresponding combination based on the information, thereby saving power. For example, the BS may provide the UE with information to limit the value of a specific field such as an antenna port field in DCI to some subsets or limit available DMRS ports. In this case, the UE may obtain the power saving effect by turning off some DMRS ports when receiving the PDSCH based on the received information. In this case, the above restriction information may be transmitted by the BS to the UE through a higher layer signal such as a MAC message or through L1 signaling such as DCI. In addition, the UE may apply such a restriction method in conjunction with the DRX operation. Specifically, the UE may apply the restriction method after a lapse of a specific time from when the UE receives the restriction information or apply DMRS port restriction only for a period in which the drx-onDurationTimer operates.

Figure 25:
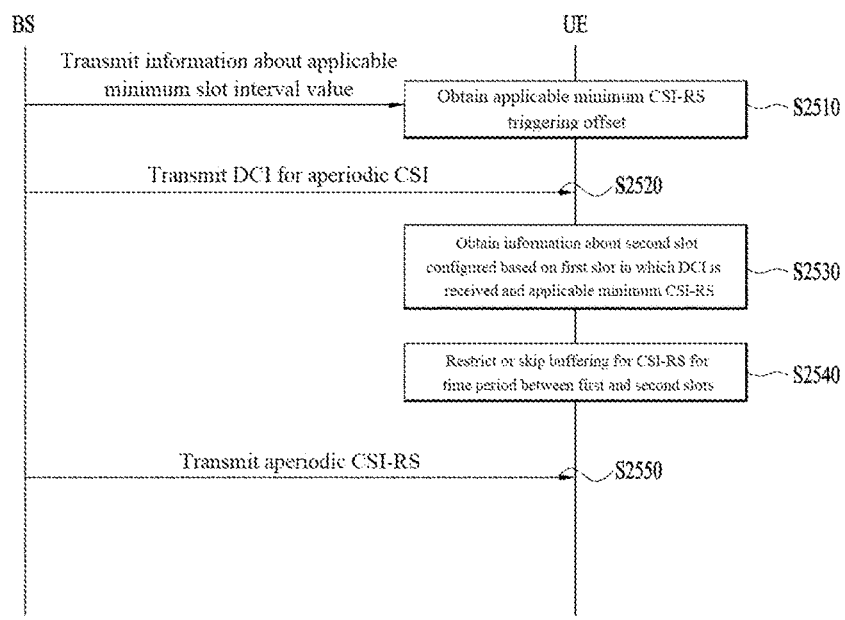
FIG. 25 is a flowchart for explaining an embodiment of the present disclosure.

FIG. 25 is a flowchart illustrating signal transmission and reception operations according to an example or implementation example related to the buffering restriction for signals such as a CSI-RS according to the present disclosure. Referring to FIG. 25, the UE may obtain an applicable minimum CSI-RS triggering offset based on a minimum slot interval applicable to scheduling of a PDCCH and a PDSCH (S2510). In addition, the UE may receive DCI triggering aperiodic CSI (S2520). Upon receiving the DCI, the UE may obtain information about a second slot, which is configured based on a first slot in which the DCI is received and a CSI-RS triggering offset greater than or equal to the applicable minimum CSI-RS triggering offset (S2530). In this case, a time interval between the first slot and the second slot may be a period in which no buffering for the CSI-RS is performed (S2540). The UE may receive a CSI-RS for the aperiodic CSI after a lapse of the corresponding period (S2550).

The present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an implementation of the present disclosure or included as a new claim by a subsequent amendment after the application is filed.

While the method by which a terminal receives a downlink signal from a base station and terminal therefor have been described based on the 3GPP LTE/LTE-A and NR systems, the method and terminal are also applicable to various wireless communication systems as well as the 3GPP LTE/LTE-A and NR systems.

What is claimed is:

1. A method of receiving an aperiodic channel state information reference signal (CSI-RS) by a user equipment (UE) from a base station (BS) in a wireless communication system, the method comprising:
   receiving information on a minimum slot interval configurable as a slot interval from a physical downlink control channel (PDCCH) reception slot to a physical downlink shared channel (PDSCH) reception slot;
   receiving, in a first slot, a PDCCH for triggering aperiodic CSI; and
   receiving, in a second slot, the CSI-RS,
   wherein the second slot is configured as a slot after the minimum slot interval from the first slot based on the information.

2. The method of claim 1, wherein the the CSI-RS is not received for a time period between the first and second slots.

3. The method of claim 1, wherein buffering for the CSI-RS is not performed for a time period between the first and second slots.

4. The method of claim 1, wherein the aperiodic CSI is reported based on the CSI-RS received in the second slot.

5. The method of claim 4, wherein the CSI-RS received in a time period between the first and second slots is not used for the aperiodic CSI.

6. The method of claim 1, wherein the second slot is a time after decoding of the PDCCH is completed.

7. The method of claim 1, wherein the UE is capable of communicating at least one of another UE other than the UE, the B S, a network, or an autonomous driving vehicle.

8. A user equipment (UE) for receiving an aperiodic channel state information reference signal (CSI-RS) from a base station (BS) in a wireless communication system, the UE comprising:
   a transceiver configured to transmit and receive a signal; and
   at least one processor configured to control the transceiver,
   wherein the at least one processor is configured to:
   control the transceiver to receive information on a minimum slot interval configurable as a slot interval from a physical downlink control channel (PDCCH) reception slot to a physical downlink shared channel (PDSCH) reception slot;
   control the transceiver to receive, in a first slot, a PDCCH for triggering aperiodic CSI; and
   control the transceiver to receive, in a second slot, the CSI-RS,
   wherein the second slot is configured as a slot after the minimum slot interval from the first slot based on the information.

9. An apparatus for receiving an aperiodic channel state information reference signal (CSI-RS) in a wireless communication system, the apparatus comprising:
   a memory; and
   at least one processor connected to the memory;
   wherein the at least one processor is configured to:
   receive information on a minimum slot interval configurable as a slot interval from a physical downlink control channel (PDCCH) reception slot to a physical downlink shared channel (PDSCH) reception slot;
   receive, in a first slot, a PDCCH for triggering aperiodic CSI; and
   receive, in a second slot, the CSI-RS,
   wherein the second slot is configured as a slot after the minimum slot interval from the first slot based on the information.

* * * * *